Sept. 18, 1928.
C. CLAUS
1,684,984
SELF ALIGNING BEARING STRUCTURE AND METHOD OF MAKING SAME
Filed May 19, 1926
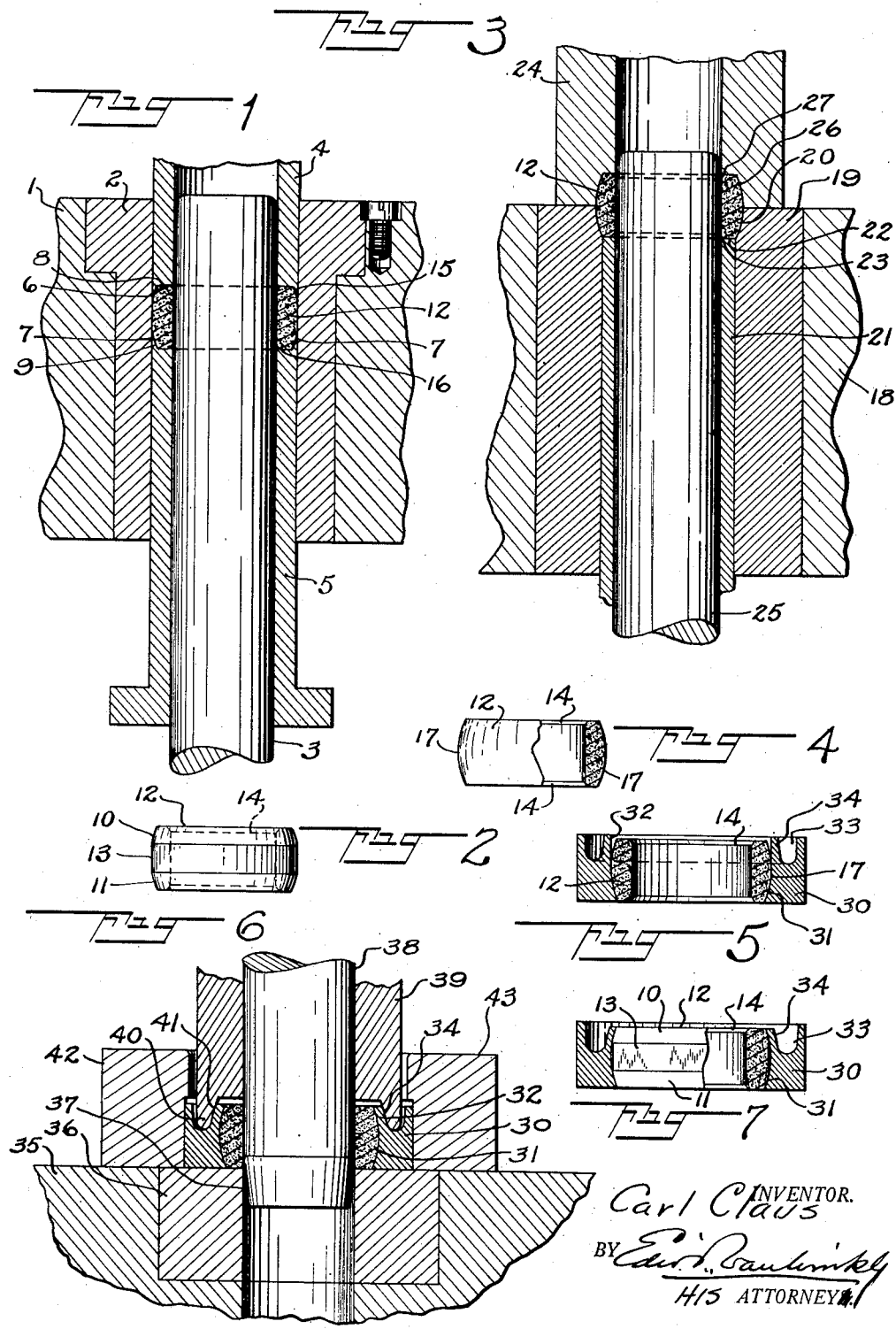
INVENTOR.
Carl Claus
BY
HIS ATTORNEY Patented Sept. 18, 1928.

1,684,984

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

SELF-ALIGNING BEARING STRUCTURE AND METHOD OF MAKING SAME.

Application filed May 19, 1926. Serial No. 110,117.

This invention relates in general to self-aligning bearing structures and a method of making the same, and it is particularly adapted for use with self-lubricating bearings, made from a mixture of finely divided metals compressed into a firm consolidated body. By my improvements, I provide an efficient form of self-aligning bearing structure, which is simple in construction and is easily manufactured by a simple method at a low cost and which may be readily assembled in operative form, and the improvements are particularly well adapted for replacing ball-bearings where the same have been used for self-aligning purposes.

One of the important features of the invention is the provision of an annular bearing-member having a cylindrical bore and a periphery curved spherically about a center coincident with the axis of the annulus, the said bearing-member being formed from self-lubricating material made by compressing a mixture of finely divided metals, with or without the addition of graphite, into a coherent consolidated mass, heat treated and sized and in some cases soaked with lubricating oil. The bearing member is adapted to receive a shaft and has a peculiar shape in cross-section, whereby when the bearing is seated in its groove in the housing and which groove is shaped accurately to fit the curvature of the periphery of the bearing-member, the latter may rock or tilt on an axis transverse to the axis of the shaft so as to maintain the alignment. Another important feature of the invention is the method of forming the bearing-member by die operations which serve to shape or form the same in a series of steps which finally result in giving to the bearing-member, a convex periphery curved spherically about the center of the bearing-member, of arcuate and true formation, without requiring further manipulation, or machining or tool work upon the same.

In practicing this invention, I find it advantageous to make the bearing-member blanks in accordance with the improvements contained in my United States Patent 1,607,-389, granted November 16, 1926, wherein I disclose a novel method and apparatus for making composite self-lubricating bearings from a mixture of powdered metals of different kinds, suitably compressed from opposite points into a consolidated mass and heat treated to form a hard body capable of absorbing lubricating oil, so that in my present invention I may start with such a blank bearing-member and subject it to the die operation steps as herein set forth.

There are other features of the invention pertaining both to the structure and the method of making it, which will appear from the more detailed description hereinafter given in connection with the drawings.

I have illustrated types of my invention in the accompanying drawings, wherein:

Fig. 1, shows a vertical section of a forming press having oppositely arranged dies with a cooperating mandrel, embodying my improvements, the bearing-member blank which is shown in the press having been operated upon by the same.

Fig. 2, shows a side elevation of the bearing-member blank as it comes from the press shown in Fig. 1.

Fig. 3, shows a vertical section of the re-shaping and sizing press having oppositely arranged dies and a central mandrel, and with a re-shaped and sized bearing-member shown in the press after the action of the dies thereon.

Fig. 4 shows a side elevation of the finished bearing-member as it comes from the sizing dies shown in Fig. 3.

Fig. 5 shows the bearing-member placed in the partially finished seat in the housing-member, in vertical section.

Fig. 6 shows a detached section of a press for assembling the housing and bearing-member, to form the completed structure which is shown in the press, also in vertical section.

Fig. 7, shows a view of a detached bearing-member assembled with its housing, the bearing-member being used without having been subjected to the final die operation; the housing being shown in vertical section and the contained bearing-member being shown partly in vertical section and partly in elevation.

Referring to the drawings, 1 is a suitable frame or table in which is set flush with its surface, a cylindrical sleeve 2, in the opposite ends of which are reciprocated in any suitable manner, the upper and lower dies 4 and 5, which are tubular in form and alike with similar working faces formed with annular marginal flanges 6 and 7, the inner surfaces of which are inclined and concave, as at 8 and 9, and form an obtuse angle with the end of each die, as indicated in cross-section in Fig. 1. These flanges have sharp edges and their inner concaved surfaces are curved spherically about the center of the dies so that they produce segmental spherical bands 10 and 11, of the exterior of the blank 12, at the edges thereof, when the dies complete their compressing operation on the blank, as shown in Figs. 1 and 2. These spherical segments are shown as something less than one-third the width of the exterior surface of the blank, but may be made wider if desired, so long as there remains a space between the opposing flanges of the dies in their extreme limit of movement towards each other, this precaution being necessary to prevent the sharp edges of the die-flanges 6 and 7, colliding with each other. Even should the dies be brought in contact and allowed to close on each other, there would be produced on the exterior of the blank a fin or rough circumferential zone which would have to be eliminated by a further operation. I therefore leave a wide flat circumferential zone 13, between the segmental spherical ones, 10 and 11, and may either use the bearing-member thus formed, or proceed a step further by placing this pressed member in another press, as shown in Fig. 3, and subjecting it to a reshaping and sizing operation. In the forming mechanism shown in Fig. 1, I use a mandrel 3, which is reciprocated in any suitable manner to take its position within both of the opposing dies 4 and 5, in which the mandrel has a sliding fit, and so as to extend completely through the length of the bore of the contained bearing-member blank 12, in order that its internal diameter may be preserved and to avoid any liability of the material of the blank being crowded into the bore or ruptured during the heavy compression of the dies.

I prefer to form the bearing-member with a bevel 14 extending around the mouth of the bore at each end thereof, and this I accomplish by providing the dies 4 and 5, with small ribs or flanges 15, 16, respectively, skirting the inner edge of the face of the same, with the inner surface of the flanges inclined to produce the bevel 14, while the outer surfaces form part of the interior wall of the dies.

The bearing-member blank 12, when placed in the forming press, as shown in Fig. 1, is ring-shaped and usually rectangular in cross-section in the condition hereinabove referred to. The dies 4 and 5, acting with equal pressure upon the opposite ends of the blank, press the material thereof so as to re-form it into the shape shown in Figs. 1 and 2, with the peripheral segmental spherical bands 10 and 11, and the intermediate flat surfaced band 13, and in which condition and shape it may be used in the housing, as shown in Fig. 7.

In order, however, to make the periphery of the bearing-member with a continuous spherical surface, as at 17, in Fig. 4, after the member 12, has been operated on by the press shown in Fig. 1, and is in the shape shown in Fig. 2, I place it in a sizing press to size and re-shape it, as shown in Fig. 3. This latter press comprises a frame 18, in which is fixed a tubular mold block or die 19, the mouth of which is formed with an annular groove or recess 20, of spherical curvature, the radius of which is the same as that of the spherical periphery 17, of the bearing member, and this recess 20, acts upon one half of the width of said periphery of said member.

Within the die 19, is disposed a supplemental tubular die 21, having a sliding fit therein and which is reciprocated by any well known means. The inner edge of die 21, is provided with a small rib or flange 23, the outer face of which slopes to receive the bevel 14, of the inserted member 12, the flat end of which rests against the flat part of the die face, as shown in Fig. 3.

Another die 24, which is of tubular form and is reciprocated in any suitable manner, is arranged to close on the lower die 18, and has the same interior diameter as the supplemental die 21, for receiving the reciprocating mandrel 25, which is disposed in both of said dies, and is actuated by any well known means. The mouth of the die 24, is formed with an annular recess 26, the main part of which is curved spherically the same as the recess 20, of die 19, while its inner edge is provided with a small flange or rib 27, with a flat part between it and the spherical part, for acting on the end of the inserted member 12, the flange 27, receiving the bevel 14, of said member.

The bearing-member blank is placed in the sizing press, by moving the die 24, away from the co-operating die 19, and then inserting the member in the recess 20, in die 19, with the mandrel extending through the bore of the member. When thus in place, the die 24, is forced down on the member 12, at the same time the supplemental die 21, is forced upwardly against it. Under this combined pressure from opposite ends, the material of the member is forced into assuming the shape provided by the operating faces of the two lower dies and the upper die, thereby moving or squeezing the material on itself and re-shaping it. This eliminates the flat central zone 13, of the member and completes the spherical formation 17 of the periphery, and finally finishes accurately the bearing-member to the required size in all its dimensions, without further manipulation, or necessitating machine or tool work thereon. Under the described operations on the bearing-member blank, the material thereof, while thus reworked to change its shape, is not however affected by the operations and it retains its desired hardness and porosity and self-lubricating quality, and it may be soaked in lubricating-oil to saturate it therewith before being installed in its housing.

The finished bearing member is placed in a housing-member 30, having its bore formed with an accurately made annular seat 31, for the bearing-member. This seat is partly finished in order to assemble the bearing-member in the housing, by having one end or half of the seat spherically curved in conformity with the curvature of the contacting part of the periphery of the bearing-member, while the other end is left straight or open at 32, (see Fig. 4,) to permit the bearing-member to be inserted endwise in the seat, after which the straight end is pressed inwardly so as to close the same snugly around the adjacent part of the bearing-member, as shown in Figs. 6 and 7.

The housing-member 30, has its open end formed with a deep groove 33, so as to provide an annular lip 34, around the mouth of the open end and which lip may be readily pressed inwardly to contract the end and complete the spherically shaped seat in the housing.

In Fig. 6, I show an assembling press comprising a suitable table 35 provided with a fixed block 36, having a cylindrical opening 37 for the passage of the mandrel 38, which may be reciprocated in any suitable manner. The mandrel is of the same diameter as the interior of the bearing-member 12, through which it passes. A tubular die 39, having an interior bore fitting over the mandrel as arranged to slide thereon in its reciprocations which may be effected in any suitable manner. The working face of the die is provided with an annular flange 40, the inner face of which is curved inwardly at 41, for engagement with the exterior of the lip 34, on the housing. Oppositely arranged stripper blocks 42 and 43, are disposed on the table so as to receive between them the housing-member 30, with the contained bearing-member in the assembling operation, the latter being entered in place by sliding the same horizontally between the strippers until centered under the mandrel and the die. The die is then forced down so that the flange 40, thereof enters the groove 33, in the housing and at the same time forced the lip 34, inwardly and closes it against the adjacent part of the periphery of the bearing-member 12, thus completing the assemblage of the two parts, ready for use.

The bearing-member thus housed is capable of rocking in response to the tilting movements of the shaft journaled therein, as its seat in the housing is of the same conformation as the spherical ridge around the periphery of the bearing-member.

In using a composite material for the bearing-member, I have employed different compositions made from mixtures of several different finely divided metals, either with or without the addition of graphite, said mixture being compressed with heavy pressure and heat treated to form a firm consolidated mass which may be soaked with oil for increasing its lubricating qualities. I have used mixtures of finely divided copper and tin, also these two metals with either lead or zinc added, the copper predominating in quantity and the proportions of the different ingredients varying with different mixtures. The bearing-member may be made from any of the well known bearing compositions which are now being used for bearings of various kinds, but I prefer to use a particular composition of materials which I have devised and which forms the subject-matter of another invention of mine, and which is not herein claimed. As the bearing-member in itself is self-lubricating and the absorbed oil adds to its lubricating capacity, my improvements have this advantage over the ball-bearings which are used for self-aligning purposes.

After the final formation and the sizing of the bearing-member 12, in all its dimensions of diameters and length, as indicated in Fig. 3, the article may be removed from the press by lifting the upper die well above the same and removing the article by hand. This removal may be facilitated by forcing up the lower die 21, so as to eject the compressed article from the die 19.

Having thus described my invention, what I claim and desire to secure by Letters Patent is;

1. The method of making a self-aligning bearing structure having an annular bearing-member arranged to rock on a seat in a housing, which consists in providing an annular bearing-member composed of finely divided metals compressed into a hard consolidated body and heat-treated, then die-pressing said body by oppositely disposed pressures to a sized form having a cylindrical bore and a convex periphery, and then pressing said annular bearing in the seat in the housing.

2. The step in the method of making a self-aligning bearing structure having an annular bearing-member capable of rocking on a seat in a housing, which consists in providing an annular bearing-member composed of a mixture of different metals finely divided and compressed into a firm consolidated body and heat treated, then die-pressing said body between non-contacting oppositely disposed reciprocating dies to form a convexed periphery with a flat zonal area, then die-pressing said body between contacting dies having curved operating faces acting upon the exterior of the body to eliminate the flat area and forming said periphery with a spherical zone the center of which is the axis of the annular body.

3. The method of producing an annular bearing-member having a cylindrical bore and a transversely curved periphery, which consists in die pressing the bearing material into annular form with a convexed periphery having a flat zone extending around it, and then again die-pressing the material to eliminate said flat zone and form the periphery with a spherical curve struck from the center of the annular form by oppositely disposed and reciprocating dies.

4. In a self-aligning bearing structure, an annular bearing-member having a cylindrical bore and a transversely arched periphery, said member being formed from a mixture of different finely divided metals compressed into a firm consolidated mass under pressure exerted from opposite ends of the member.

In testimony whereof, I have hereunto set my hand.

CARL CLAUS.